United States Patent [19]

de Man et al.

[11] Patent Number: 4,636,691

[45] Date of Patent: Jan. 13, 1987

[54] ARRANGEMENT INCLUDING A METAL VAPOR DISCHARGE TUBE PROVIDED WITH AT LEAST TWO INTERNAL ELECTRODES

[75] Inventors: Rolf E. de Man; Jan de Ridder; Leo M. Sprengers; Jozef I. C. Peeters, all of Eindhoven, Netherlands

[73] Assignee: U.S. Philips Corporation, New York, N.Y.

[21] Appl. No.: 562,340

[22] Filed: Dec. 16, 1983

[30] Foreign Application Priority Data

Dec. 29, 1982 [NL] Netherlands ............... 8205026

[51] Int. Cl.⁴ ............... H05B 37/02; H05B 39/04; H05B 41/36
[52] U.S. Cl. ............... 315/209 R; 313/638; 313/25; 315/DIG. 7; 315/58; 315/DIG. 2
[58] Field of Search ............ 315/326, DIG. 1, DIG. 5, 315/DIG. 7, 209 R, 58, 62; 313/25, 638, 113

[56] References Cited

U.S. PATENT DOCUMENTS

| 3,824,428 | 7/1974 | Spira et al. ............... 315/105 |
| 4,071,798 | 1/1978 | Hammond ............... 313/113 X |
| 4,329,627 | 5/1982 | Holmes ............... 315/209 R |
| 4,349,764 | 9/1982 | Steeman et al. ............... 315/58 |
| 4,395,659 | 7/1983 | Aoike et al. ............... 315/209 R |
| 4,398,126 | 8/1983 | Zuchtriegel ............... 315/209 R X |
| 4,464,607 | 8/1984 | Peil et al. ............... 315/209 R |

FOREIGN PATENT DOCUMENTS 2302685 7/1974 Fed. Rep. of Germany ........ 315/62

Primary Examiner—Saxfield Chatmon
Attorney, Agent, or Firm—Robert T. Mayer; Bernard Franzblau

[57] ABSTRACT

An arrangement including a frequency converter (4) and a discharge lamp (10) connected thereto wherein the frequency converter (4) is of a type whose output frequency is at least 80 kHz, while the lamp is a low-pressure sodium vapor discharge lamp. This lamp supply system provides a high luminous efficacy for the lamp.

15 Claims, 3 Drawing Figures

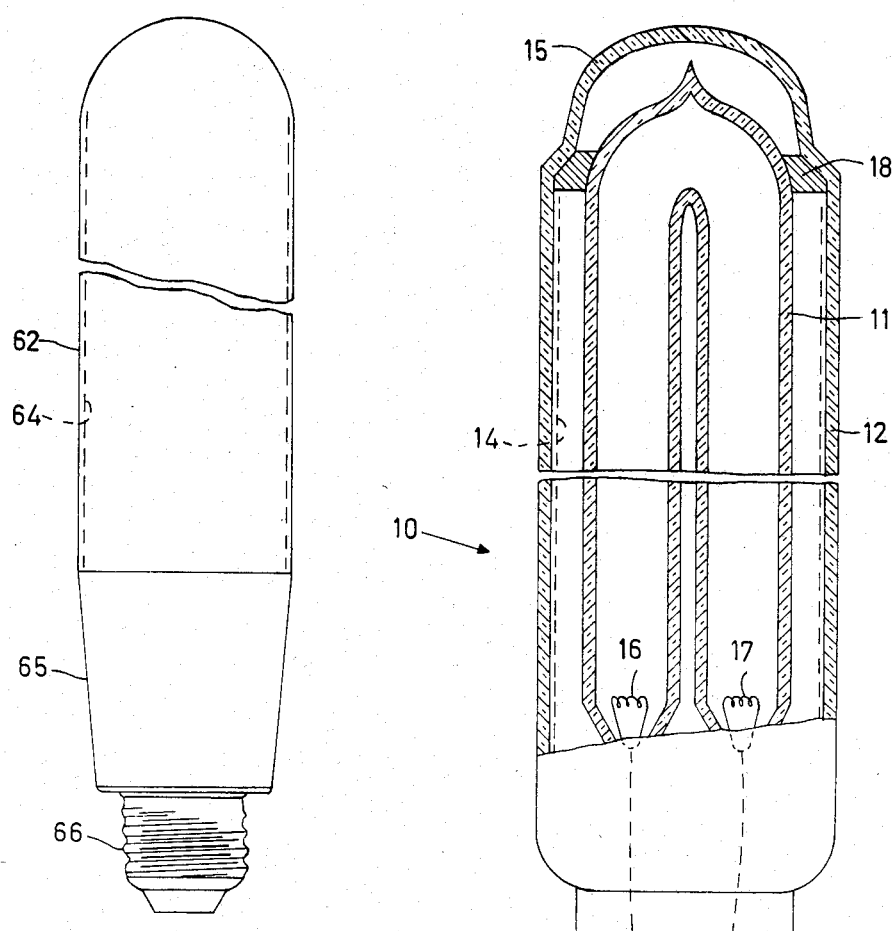
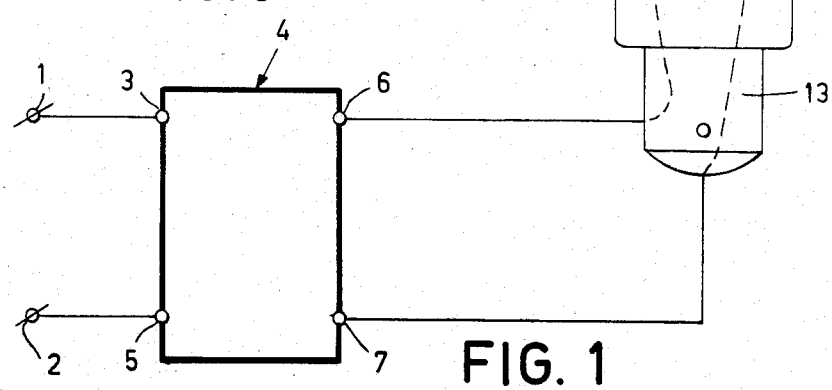
FIG. 3
FIG. 1

ARRANGEMENT INCLUDING A METAL VAPOR DISCHARGE TUBE PROVIDED WITH AT LEAST TWO INTERNAL ELECTRODES

This invention relates to an arrangement including a metal vapour discharge tube provided with at least two internal electrodes, and a frequency converter for supplying the discharge tube with alternating current through these electrodes, the interior of the discharge tube containing sodium and the output frequency of the frequency converter being at least 6 kHz.

A known arrangement of the kind mentioned is described, for example, in U.S. Pat. No. 3,824,428. In this known device, the output frequency of the frequency converter deviates only slightly from the said value of 6 kHz.

This known arrangement has the disadvantage that, when a low-pressure sodium vapour discharge tube is used therein, the luminous efficacy, expressed, for example, in lumen/W, of this discharge tube is generally not larger than in the case of an AC supply at a frequency of 50 to 60 Hz.

The invention has for an object to make it possible to obtain, in an arrangement of the kind mentioned in the opening paragraph which uses a low-pressure sodium vapour discharge tube, a comparatively high luminous efficacy of the discharge tube.

An arrangement according to the invention, comprising a metal vapour discharge tube provided with at least two internal electrodes, and a frequency converter for supplying the discharge tube with alternating current through these electrodes, the interior of the discharge tube containing sodium and the output frequency of the frequency converter being at least 6 kHz, is characterized in that the discharge tube is a low-pressure sodium vapour discharge tube containing a rare gas and in that the output frequency of the frequency converter is at least 80 kHz.

This arrangement has the advantage that the luminous efficacy of the discharge tube is very high.

For further explanation, it should be noted that the efficiency of the supply device, as of the frequency converter, is left out of consideration in the first instance. An increase of the supply frequency, of a low-pressure sodium vapour discharge lamp, from 6 kHz to approximately 30 kHz in experiments carried out by the inventors showed—with a constant lamp power—no increase of the luminous efficacy. On the contrary, at frequencies of 10 to 30 kHz, a decrease of the luminous efficacy was ascertained. A range unstable with regard to efficiency appears to exist between 30 kHz and approximately 80 kHz. The arc between the electrodes of the discharge tube of the low-pressure sodium lamp is then frequently found—in the operating condition—to be unstable. The luminous efficacy is then sometimes high and sometimes low.

Only at a still higher frequency, i.e. of at least 80 kHz, is a stable situation obtained, in which the luminous efficacy is comparatively high.

The inventors have found that upon a further increase of the supply frequency of the low-pressure sodium vapour discharge lamp in the frequency range above 80 kHz the luminous efficacy first increases and then remains substantially constant.

It should be noted that the invention is based on the idea to overcome the barrier of approximately 30 kHz when supplying a low-pressure sodium vapour discharge lamp. The invention is further based on the idea to indicate a frequency above 30 kHz which the luminous efficacy of the sodium lamp—in continuous operation—is free of large temporary variations. This generally means a stable arc.

In this connection it should be noted that, when in known manner another type of discharge tube—that is to say a low-pressure mercury vapour discharge tube—is supplied at a frequency higher than 50 to 60 Hz, already at approximately 20 kHz a considerable gain in efficiency is attained. Despite this fact and despite the disappointing results—with regard to luminous efficacy—of supplying a low-pressure sodium lamp at frequencies up to 30 kHz, the inventors have nevertheless overcome this barrier.

The output frequency of the frequency converter could be, for example, a few MHz. In a preferred embodiment of the invention, the output frequency of the frequency converter is at most 800 kHz. An advantage of this device is that on the one hand—in designing it—a limitation of the stray radiation of the lamp and that of the associated frequency converter in the MHz range need not be taken into account, whereas on the other hand the constant high value of the luminous efficacy of a low-pressure sodium vapour discharge lamp is reached frequently already at this value of 800 kHz.

In an improvement of the said preferred embodiment of the invention, the discharge tube has a practically circular cross-section, the inner diameter of which lies between 10 and 20 mm.

An advantage of this improved preferred embodiment is that the luminous efficacy in the case of a supply in the indicated frequency range of 80 kHz to 800 kHz is then considerably higher in percentage than that in the case of supply at, for example, 50 to 60 Hz. In a low-pressure sodium vapour discharge lamp comprising a discharge tube whose inner diameter is smaller than 10 mm, this gain in percentage appeared to be smaller. An inner diameter of the discharge tube of more than 20 mm generally leads to a low-pressure sodium vapour discharge lamp that cannot be manipulated.

In a further preferred embodiment of the invention, the low-pressure sodium vapour discharge tube and the frequency converter form part of the same lamp unit, the low-pressure sodium vapour discharge tube being surrounded by a transparent electrically conducting layer. An advantage of this preferred embodiment is inter alia that the discharge tube can be connected to the frequency converter by means of comparatively short electrical conductors. This means that the self inductance of these conductors—at the high frequency of more than 80 kHz—exerts only little influence on the supply of the discharge tube. A further advantage of this preferred embodiment is that the transparent electrically conducting layer reduces stray radiation of the electrical field produced in the discharge tube. The conductive layer is preferably connected electrically to an electrode of the discharge tube.

The said lamp unit may be provided, for example, with an externally threaded cap which fits into a lamp holder for an incandescent lamp.

Embodiments of the invention will now be described more fully with reference to the accompanying drawings, in which:

FIG. 1 is a schematic representation of an arrangement according to the invention which comprises a frequency converter and a low-pressure sodium vapour discharge tube connected thereto;

FIG. 3 shows a second arrangement according to the invention-constructed as a lamp unit.

Figure 2:
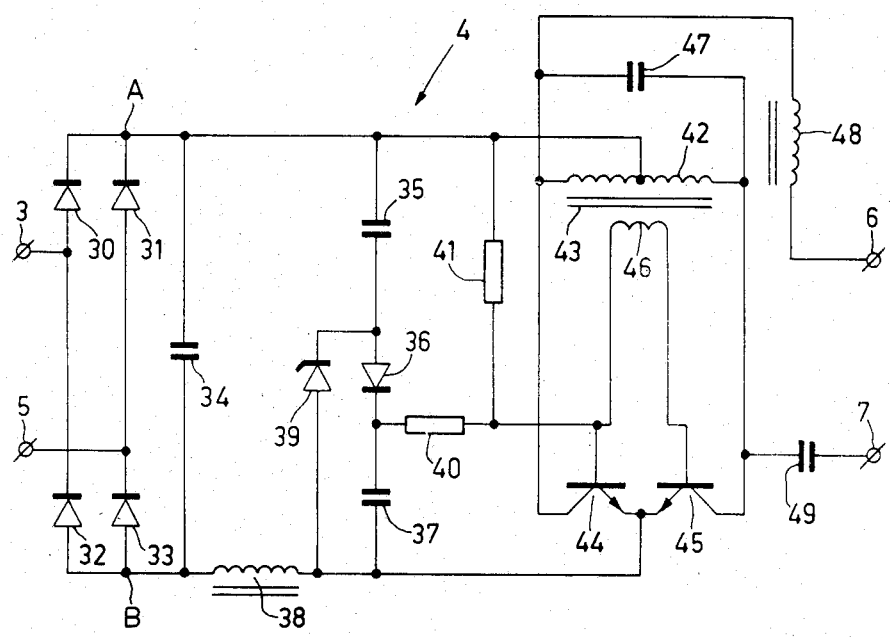
FIG. 2 shows the electric circuit diagram of the frequency converter of FIG. 1.

In FIG. 1, reference numerals 1 and 2 designate input terminals intended to be connected to an alternating voltage source of, for example, 120 V, 60 Hz. The terminal 1 is connected to an input terminal 3 of a frequency converter 4. The terminal 2 is connected to an input terminal 5 of the frequency converter 4.

Reference numerals 6 and 7 designate output terminals of the frequency converter.

The terminal 6 is connected to a low-pressure sodium vapour discharge lamp 10. The lamp 10 is shown partly in longitudinal sectional view and partly in elevation. The terminal 7 of the frequency converter 4 is likewise connected to the lamp 10.

The lamp 10 is provided with a discharge tube 11 which is bent in the form of a U and which is surrounded by an outer bulb 12. This outer bulb 12 has the form of a circular cylinder. Reference numeral 13 denotes a lamp cap provided with connection members for the electrical connection to the frequency converter 4. The inner wall of the outer bulb 12 is provided with an indium oxide layer 14 which is translucent to sodium light, but reflects infrared radiation. This layer is indicated by a broken line. The layer thickness is approximately 0.5 μm. At the end of the outer bulb 12 remote from the lamp cap 13 there is disposed a hemispherical end portion 15. An electrode 16 and an electrode 17 are provided in respective ends of the U-shaped discharge tube. Reference numeral 18 designates a member for supporting the discharge tube 11 spaced from the outer bulb 12. The length of the lamp is approximately 20 cm. The outer diameter of the outer bulb 12 is approximately 5 cm. The inner diameter of each of the limbs of the discharge tube 11 is approximately 1.5 cm. This means that this diameter lies in the range of 10 to 20 mm. The discharge tube contains, besides an excess quantity of sodium, also a rare gas, in this case neon with an addition of 1% of argon. The pressure of the rare gas is approximately 1150 Pascal. The lamp 10 roughly corresponds to that described in United Kingdom Patent Specification 1558016.

In FIG. 2, reference numerals 3 and 5 again designate the input terminals of the frequency converter 4. Further, reference numerals 6 and 7 again designate the output terminals of this frequency converter. The converter comprises an AC/DC part followed by a DC/AC push-pull converter.

For this purpose, a diode bridge 30,31,32,33 is connected to the input terminals 3 and 5 of the frequency converter. The output terminals A and B of this diode bridge are connected to each other by means of a capacitor 34. Further, a series arrangement of a capacitor 35, a diode 36 and a further capacitor 37 is connected to the terminal A. The capacitor 37 is further connected through a coil 38 to the terminal B. The series arrangement of the diode 36 and the capacitor 37 is shunted by a Zener diode 39.

A resistor 40 is connected to a junction point between the diode 36 and the capacitor 37. The other end of this resistor 40 is connected through a resistor 41 to the terminal A. The terminal A is also connected to a centre tap of a primary winding 42 of a transformer 43. One end of the winding 42 is connected to the collector of a transistor 44. A second end of the winding 42 is connected to the collector of a transistor 45. The emitters of the two transistors 44 and 45 are connected to each other and are further connected to the coil 38.

A junction point between the resistors 40 and 41 is connected to the base of the transistor 44. The base of the transistor 44 is further connected to the base of the transistor 45 through a secondary winding 46 of the transformer 43.

The primary winding 42 is shunted by a capacitor 47.

Finally, the collector of the transistor 44 is connected through a coil 48 to the output terminal 6, and the collector of the transistor 45 is connected through a capacitor 49 to the output terminal 7.

In an embodiment described with reference to FIG. 1 and FIG. 2, in which the voltage between the input terminals is approximately 120 V, 60 Hz, the output frequency of the frequency converter 4 is approximately 160 kHz. Approximately 18 W is then consumed by the lamp 10. The luminous flux is approximately 1980 lumen. The luminous efficacy consequently is approximately 110 lumen/Watt.

In the case where the same lamp was supplied at 60 Hz through an autotransformer of the leakage type, and the power of the lamp 10 was likewise 18 W, the luminous efficacy of the lamp was then only 96 lumen/Watt.

The so-called system efficiency of the combination of the frequency converter 4 and the lamp 10 of the described device according to the invention is approximately 90 lumen/Watt. The system efficiency of the comparable combination—not in accordance with the invention—comprising the lamp 10 and an autotransformer of the leakage type at 60 Hz is only approximately 55 lumen/Watt.

In the example of FIG. 1 and FIG. 2, the circuit elements have approximately the following values:

| resistor 40: | 3.3 kΩ |
| resistor 41: | 33 kΩ |
| capacitor 34: | 22 μF |
| capacitor 35: | 150 pF |
| capacitor 37: | 15 μF |
| capacitor 47: | 1 nF |
| capacitor 49: | 100 nF |
| coil 38: | 6 mH |
| coil 48: | 0.8 mH. |

Each half of the primary winding of the transformer 43 has approximately 80 turns. The secondary winding 46 consists of only one turn.

When the lamp 10 shown (see FIG. 1) is supplied with alternating voltages at other frequencies than the output frequency of the frequency converter 4, the values of the luminous efficacy indicated in Table I are found. The lamp power is invariably 18 W.

TABLE I

| Frequency (kHz) | luminous efficacy (lumen/watt) |
| --- | --- |
| 100 | 106 |
| 160 | 110 |
| 200 | 115 |
| 400 | 120 |
| 700 | 121 |
| 1000 | 121 |

The choice of frequency of the arrangement of FIG. 1 and FIG. 2 (160 kHz) is also determined by the properties—such as, for example, the efficiency—of the frequency converter 4.

It appears from the table that with increasing frequency the luminous efficacy of the lamp first increases and then remains practically constant.

FIG. 3 shows in elevation a lamp unit which is provided with a second arrangement according to the invention. In FIG. 3, reference numeral 62 designates a circular-cylindrical outer bulb which surrounds a U-shaped low-pressure sodium vapour discharge tube (not shown). The inner wall of the outer bulb 62 is provided—in a similar manner to that in the lamp of FIG. 1—with an indium oxide layer 64. This layer is both transparent and electrically conducting. The layer 64 is electrically connected to an electrode of the discharge tube. The layer 64 is transparent to the sodium light produced in the lamp unit. The electrical conductivity of the layer 64 limits inter alia the stray electrical radiation of the lamp unit.

The construction of the U-shaped discharge tube (not shown) as well as its filling are similar to those of the discharge tube 11 of FIG. 1. The electrode gap in the case of FIG. 3 is larger, however. In fact, in this case a lamp of approximately 35 W is shown.

Reference numeral 65 designates a frequency converter. A lamp cap of the lamp unit is designated by reference numeral 66.

The diameter of the outer bulb 62 is approximately 5 cm. The overall length of the lamp unit is approximately 50 cm.

In an embodiment, the lamp cap 66 is arranged in a lamp holder (not shown) and is supplied through the latter with an alternating voltage of approximately 220 V, 50 Hz.

This alternating voltage is applied between two input terminals of the frequency converter 65 in a similar manner to that of the frequency converter 4 of FIG. 1.

The output frequency of the converter 65 is approximately 215 kHz in this case. This converter is provided, for example, with a half-bridge rectifying circuit. Output terminals of the frequency converter 65 are connected to internal electrodes of the discharge tube which is located inside the outer bulb 62.

The lowermost line of table II indicates the results of the lamp part of the lamp unit. For comparison, the first line indicates the results obtained when supplying the same lamp part in a manner not in accordance with the invention, i.e. when the lamp part is supplied—through an electrical coil—with an alternating voltage at approximately 50 Hz, with the same lamp power of 35 W.

TABLE II

| Frequency (Hz) | Lumen | luminous efficacy (lumen/watt) |
| --- | --- | --- |
| 50 | 5365 | 153 |
| 215K | 6130 | 175 |

From this it appears that the luminous efficacy of a low-pressure sodium lamp, when supplied in a special range of high frequency, can be more than ten percent higher than with the known low frequency supply of this lamp. From the viewpoint of energy saving, this is a great advantage with this light source, which as yet is already efficient.

It is possible that in an arrangement according to the invention, use may also be made of a low-pressure sodium vapour discharge tube with a power different from that of the aforementioned tubes.

The frequency converter may supply, for example, more than one discharge tube. This might occur, for example, in the case of a luminaire provided with two or more discharge tubes.

What is claimed is:

1. An arrangement comprising a metal vapour discharge tube, provided with at least two internal electrodes, and a frequency converter for supplying the discharge tube with alternating current through said electrodes, the interior of the discharge tube containing sodium, characterized in that the discharge tube comprises a low-pressure sodium vapour discharge tube containing a rare gas and in that the output frequency of the frequency converter is at least 80 kHz.

2. An arrangement as claimed in claim 1, characterized in that the output frequency of the frequency converter is at most 800 kHz.

3. An arrangement as claimed in claim 2, characterized in that the discharge tube has a substantially circular cross-section with an inner diameter between 10 and 20 mm.

4. An arrangement as claimed in claim 3, characterized in that the low-pressure sodium vapour discharge tube and the frequency converter form part of the same lamp unit, the low-pressure sodium vapour discharge tube being surrounded by a transparent electrically conducting layer.

5. An arrangement as claimed in claim 1 wherein the low-pressure sodium vapour discharge tube and the frequency converter form part of the same lamp unit, the low-pressure sodium vapour discharge tube being surrounded by a transparent electrically conducting layer.

6. An arrangement as claimed in claim 2 wherein the low-pressure sodium vapour discharge tube and the frequency converter form part of the same lamp unit, the low-pressure sodium vapour discharge tube being surrounded by a transparent electrically conducting layer connected to a lamp electrode.

7. A lighting unit comprising: a pair of input supply terminals for connection to a low frequency source of AC supply voltage, a low-pressure sodium vapor discharge tube containing sodium and having at least two internal electrodes, and a frequency converter having input terminals connected to said pair of supply terminals and output terminals connected to said electrodes of the discharge tube for supplying an alternating current to said electrodes at a frequency of at least 80 KHz in the operating condition of the discharge tube.

8. A lamp unit as claimed in claim 7 wherein the discharge tube comprises a U-shaped glass envelope with a substantially circular cross-section with an inner diameter between 10 and 20 mm, said discharge tube being mounted within an outer glass bulb.

9. A lamp unit as claimed in claim 7 wherein the discharge tube comprises a U-shaped glass envelope with a substantially circular cross section and said alternating current of a frequency of at least 80 KHz produces an increase in the tube luminous efficacy of approximately 10% over the tube luminous efficacy at 60 Hz, said discharge tube being mounted within an outer glass bulb having an inner wall coated with a transparent electrically conductive infrared reflective layer of indium oxide.

10. A lamp unit as claimed in claim 7 wherein said frequency converter comprises, in cascade between the input and output terminals, an AC/DC circuit that converts an AC supply voltage to a DC supply voltage, and a DC/AC push-pull converter including a pair of push-pull operated transistors.

11. A lamp unit as claimed in claim 7 further comprising: an outer glass bulb in which said discharge tube is mounted, a casing to which the outer bulb is mounted and within which the frequency converter is mounted so as to form an integral lamp unit, said discharge tube being a U-shaped glass envelope with an electrode at each end of the legs of the U and with said leg ends adjacent the casing so that the output terminals of the frequency converter are physically close to said tube electrodes whereby the frequency converter is connected to the discharge tube by comparatively short electric conductors having a negligible self-inductance at a frequency of 80 KHz or more.

12. A lamp unit as claimed in claim 11 wherein said outer glass bulb comprises a layer of light transparent electrically conductive infrared reflective indium oxide.

13. A lamp unit as claimed in claim 7 wherein the discharge tube is mounted within a glass outer bulb having an inner wall coated with a layer of electrically conductive material transparent to sodium light and electrically connected to an electrode of the discharge tube thereby to reduce stray radiation of an electric field produced within the discharge tube.

14. A lamp unit as claimed in claim 7 wherein the discharge tube contains, in addition to sodium, neon gas with 1% argon and at a pressure of approximately 1150 Pascal.

15. A method of operating a low-pressure sodium vapor discharge tube so as to increase the luminous efficacy thereof comprising the following steps: converting a low-frequency AC supply voltage into a DC supply voltage, converting said DC supply voltage into a high frequency alternating voltage in a frequency range between 80 KHz and 800 KHz, and supplying said high frequency alternating voltage to a pair of electrodes of the discharge tube so as to increase the value of the tube luminous efficacy above its luminous efficacy value in the frequency range of 60 Hz to 30 KHz.

* * * * *